US012473871B2

(12) United States Patent
Devani et al.

(10) Patent No.: US 12,473,871 B2
(45) Date of Patent: Nov. 18, 2025

(54) CYLINDER LINER HAVING COOLANT FLOW BALANCER AND ENGINE POWER ASSEMBLY USING SAME

(71) Applicant: Progress Rail Locomotive Inc., LaGrange, IL (US)

(72) Inventors: Farhan F Devani, Park Ridge, IL (US); Joshua D. Schueler, New Lenox, IL (US); Jeffrey P Nowak, Dyer, IN (US)

(73) Assignee: Progress Rail Locomotive Inc., Peoria, IL (US)

( * ) Notice: Subject to any disclaimer, the term of this patent is extended or adjusted under 35 U.S.C. 154(b) by 0 days.

(21) Appl. No.: 18/442,825

(22) Filed: Feb. 15, 2024

(65) Prior Publication Data

US 2025/0264073 A1 Aug. 21, 2025

(51) Int. Cl.

*F02F 1/14* (2006.01)
*F02F 1/00* (2006.01)
*F02F 1/16* (2006.01)

(52) U.S. Cl.

CPC ................ *F02F 1/14* (2013.01); *F02F 1/004* (2013.01); *F02F 1/16* (2013.01)

(58) Field of Classification Search

CPC ...... F02F 1/14; F02F 1/16; F02F 1/004; F02F 11/005; F01P 1/02; F01P 1/06; F01P 2001/023; F01P 3/02; F01P 3/12; F01P 2003/002; F01P 7/14; F01P 2007/143

See application file for complete search history.

(56) References Cited

U.S. PATENT DOCUMENTS 3,534,715 A * 10/1970 Foreman ................... F01B 7/14 123/41.79
4,093,842 A * 6/1978 Scott ........................ C21D 1/09 148/903
5,062,393 A * 11/1991 Smith ................... F02F 1/4214 123/41.72
6,079,375 A * 6/2000 Duerr ........................ F02F 1/14 123/41.72
8,938,350 B2 1/2015 Silvers et al.
10,697,393 B2 * 6/2020 Becker ..................... F16J 10/04
2005/0284426 A1 * 12/2005 Tusinean .............. F02B 71/045 123/46 R (Continued)

FOREIGN PATENT DOCUMENTS

EP 0558583 B1 6/1994
JP 4276128 B2 * 6/2009 ................ F01P 3/02

(Continued)

*Primary Examiner* — Grant Moubry

(57) ABSTRACT

A cylinder liner in a power assembly for an engine includes an elongate liner body including a water jacket surface and a plurality of combustion air ports extending from an outer liner surface to an inner liner surface. A coolant supply passage extends from a coolant inlet formed in an outer liner surface, to a water jacket feed outlet spaced axially from the plurality of combustion air ports. A flow balancer for coolant is positioned in a coolant flow path extending in an axial direction along the water jacket surface from the water jacket feed outlet. The cylinder liner may form, in service in an engine, an upper water jacket, and a lower air annulus. The flow balancer assists in normalizing a flow and pressure of coolant through the water jacket.

20 Claims, 3 Drawing Sheets

(56) References Cited

U.S. PATENT DOCUMENTS

| | | | | |
|---|---|---|---|---|
| 2006/0042575 | A1 * | 3/2006 | Schmuecker | F02B 71/04<br>123/46 R |
| 2008/0035081 | A1 * | 2/2008 | Ruble | F02F 1/16<br>123/41.84 |
| 2018/0066601 | A1 * | 3/2018 | Sharma | F02F 1/163 |

FOREIGN PATENT DOCUMENTS

| | | | |
|---|---|---|---|
| JP | 5721595 | B2 | 5/2015 |
| WO | 2012023502 | A1 | 2/2012 |
| WO | 2012105290 | A1 | 8/2012 |

* cited by examiner

CYLINDER LINER HAVING COOLANT FLOW BALANCER AND ENGINE POWER ASSEMBLY USING SAME

TECHNICAL FIELD

The present disclosure relates generally to a cylinder liner in an engine power assembly, and more particularly to a cylinder liner having a flow balancer for coolant flow in an upper water jacket.

BACKGROUND

Internal combustion engines are used globally for diverse purposes ranging from vehicle propulsion to operation of pumps, compressors, and electric generator equipment. In a typical implementation, fuel and air are delivered into a combustion chamber in the engine, and ignited to produce a rapid temperature and pressure rise that drives a piston coupled to a crankshaft operating a load. In a traditional four-stroke engine cycle, the piston moves up and down between a top dead center position and a bottom dead center position to execute each of an intake stroke, a compression stroke, an expansion stroke, and an exhaust stroke, for each full revolution of the crankshaft. In a two-stroke engine cycle the piston moves up and down only once for a full revolution of the crankshaft to perform intake, compression, expansion, and exhaust.

The combustion process generates significant heat necessitating relativity sophisticated cooling apparatus in most engine applications. In so-called water-cooled engines a coolant liquid, typically mostly water, is circulated through an engine housing to carry away heat. Air cooling of certain systems and subsystems of engines is also widely used. Cylinder liners are conventionally employed in many engines to form the combustion chamber itself in conjunction with a piston and a cylinder head. The cylinder liner is typically installed in an engine housing and commonly configured to participate in the liquid-cooling and sometimes air-cooling processes, as well as provision of engine oil for lubrication and additional cooling of the associated piston. Cylinder liners typically have a limited service life and can be swapped out for new cylinder liners periodically. One known two-stroke internal combustion engine is set forth in U.S. Pat. No. 8,938,350 B2 to Silvers et al. Engineers are continually seeking new and improved strategies for engine construction and operation relating to heat management, manufacturability, and other factors.

SUMMARY

In one aspect, a cylinder liner includes an elongate liner body defining a longitudinal axis, and including an inner liner surface, an outer liner surface having a water jacket surface extending circumferentially around the longitudinal axis, and a plurality of combustion air ports extending from the outer liner surface to the inner liner surface. The cylinder liner further includes a coolant supply passage extending from a coolant inlet formed in the outer liner surface, to a water jacket feed outlet spaced axially from the plurality of combustion air ports, and a flow balancer for coolant, formed on the outer liner surface, positioned in a coolant flow path extending in an axial direction along the water jacket surface from the water jacket feed outlet.

In another aspect, a power assembly for an engine includes a cylinder head assembly having a cylinder head, a cylinder liner coupled to the cylinder head assembly and defining a longitudinal axis, and a piston assembly including a piston. The cylinder liner includes an inner liner surface forming, together with the cylinder head and the piston, a combustion chamber, an outer liner surface including a water jacket surface extending circumferentially around the longitudinal axis, and a plurality of combustion air ports for conveying combustion air into the combustion chamber. The cylinder liner further includes a flow balancer formed on the water jacket surface.

In still another aspect, an engine includes an engine housing forming an air box, and a power assembly supported in the engine housing and including a cylinder liner, the cylinder liner having formed therein a plurality of combustion air ports fluidly connected to the air box. The cylinder liner includes an outer water jacket surface extending between the plurality of combustion air ports and an upper liner end, and an outer air annulus surface extending between the plurality of combustion air ports and a lower liner end. The power assembly further includes a jacket piece attached to the cylinder liner and forming, together with the outer water jacket surface, an upper water jacket, and an air annulus formed between the outer air annulus surface and the engine housing and fluidly connected to the air box.

DETAILED DESCRIPTION

Figure 1:
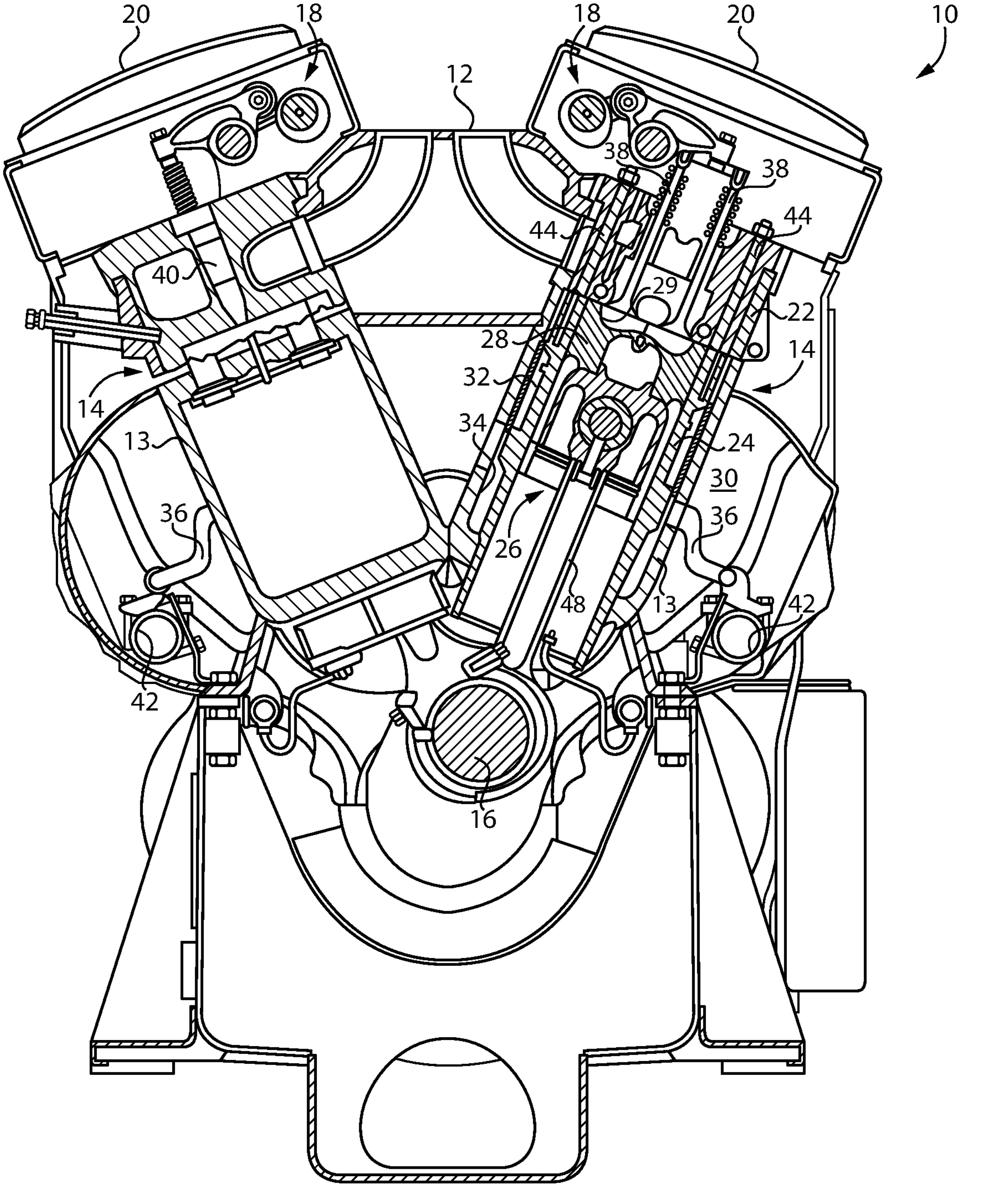
FIG. 1 is a sectioned diagrammatic view of an engine, according to one embodiment.

Referring to FIG. 1, there is shown an internal combustion engine 10, according to one embodiment. Engine 10 includes an engine housing 12 including a crankcase 13, and a plurality of engine power assemblies 14 each supported in engine housing 12 and received within crankcase 13. Engine housing 12 forms an air box 30 in a generally conventional manner, extending around engine power assemblies 14. Each engine power assembly 14, hereinafter referred to at times in the singular, includes a cylinder head or cylinder head assembly 22, a cylinder liner 24 coupled to cylinder head assembly 22, and a piston assembly 26 including a piston 28. Engine power assembly 14 will be coupled to a crankshaft 16 by way of a connecting rod 48 of piston assembly 26 in a generally known manner. A valvetrain 18 including suitable rocker arms coupled to a camshaft, for example, is coupled to engine power assembly 14 to actuate components also in a generally conventional manner. FIG. 1 illustrates engine 10 having a V-configuration, however, it will be appreciated that engine power assemblies according to the present disclosure may be arranged in any suitable manner. A valve cover 20 is also coupled to engine power assembly 14.

Engine 10 may be operated similarly to certain known engines, including in a two-stroke engine cycle where combustion air is admitted into a combustion chamber 29 defined by cylinder liner 24, piston 28, and cylinder head assembly 22, and exhaust conveyed out by way of exhaust valves 38. In the engine power assembly 14, part of which is shown, on the left-hand side of FIG. 1 a fuel injector 40 is visible. Engine 10 can be direct-injected and operated on a suitable compression-ignition liquid fuel, such as a diesel distillate fuel. Other engine configurations and operating strategies are within the scope of the present disclosure, however, including a four-stroke engine cycle, port injection, spark-ignition, and various alternative fuels including liquid fuels and/or or gaseous fuels. Engine 10 can be applied in a range of applications including for vehicle propulsion, including for operating a drivetrain or an electric generator in a locomotive.

Cylinder head assembly 22 can be attached to cylinder liner 24 by way of a plurality of head bolts 44. Also in the illustrated embodiment, a water jacket 32 is formed around cylinder liner 24, as well as a lower air annulus 34. Water jacket 32 may be understood as an upper water jacket whereby coolant liquid is conveyed along and through cylinder liner 24 and into cylinder head assembly 22. Air annulus 34 may extend circumferentially around cylinder liner 24 and conveys air from air box 30 around cylinder liner 24. In contrast to certain known engine and engine power assembly configurations no lower water jacket at all may be used, and cooling achieved by way of liquid coolant in water jacket 32 and air in air annulus 34 at least principally. FIG. 1 also illustrates a water inlet manifold 42, and a water jumper line 36 that extends to cylinder liner 24 from water inlet manifold 32 to provide a flow of liquid coolant to feed the respective water jacket and cylinder head assembly as further discussed herein.

Figure 2:
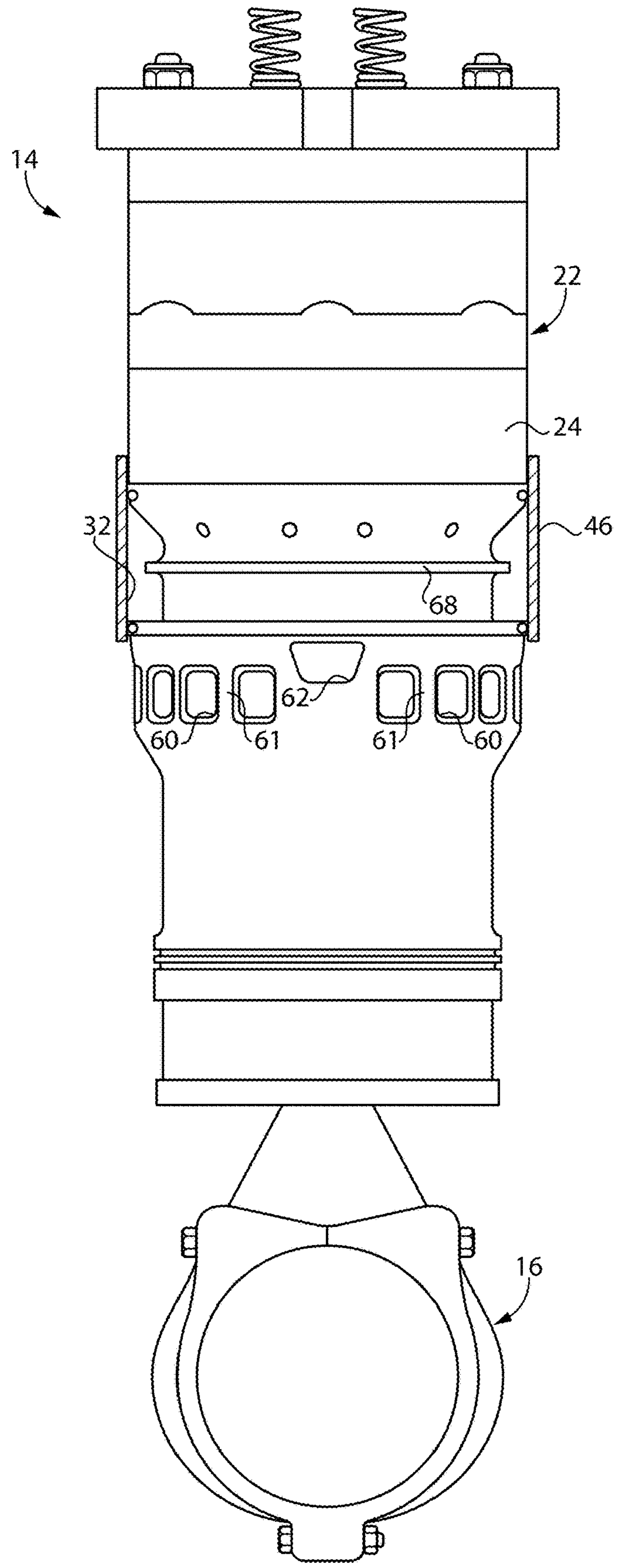
FIG. 2 is a diagrammatic view of a power assembly for an engine, according to one embodiment.

Referring also now to FIG. 2 there are shown features of engine power assembly 14 in additional detail, showing piston assembly 26 extending into cylinder liner 24, which is in turn attached to cylinder head assembly 22. A jacket piece 46 is attached to liner 24 and forms water jacket 32 together with cylinder liner 24 as further discussed herein. Jacket piece 46 may include a cylindrical spinning or the like having, for example, a wall thickness less than a wall thickness of cylinder liner 24. Those skilled in the art will be familiar with engine power assemblies sold as replacement parts installed in place of used engine power assemblies in an engine. Engine power assembly 14 may thus be sold as a standalone after market system. Individual components of engine power assembly 14, including cylinder liner 24, may also be provided for installation in a new engine or a used engine returned from service, in place of a used cylinder liner.

Figure 3:
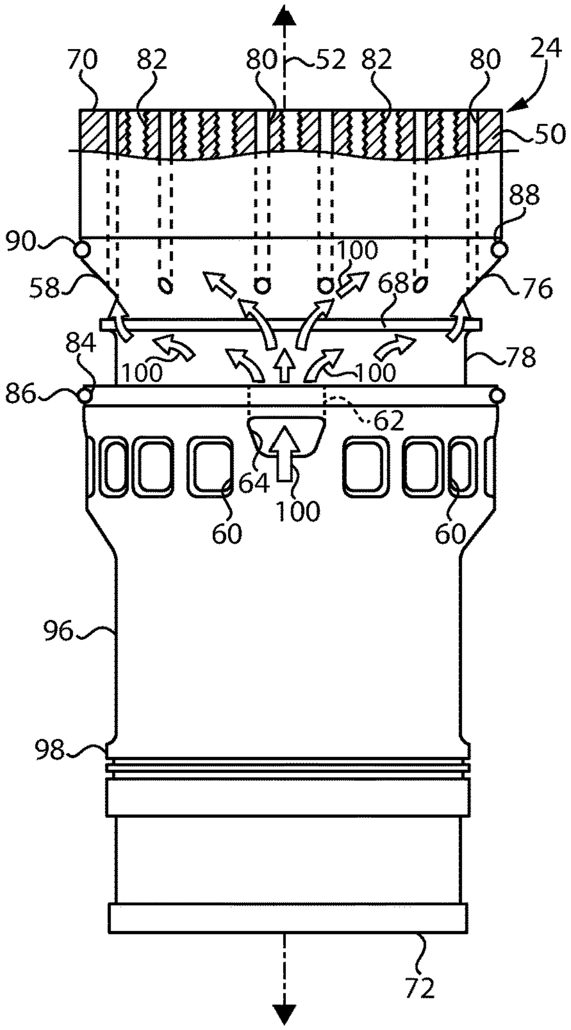
FIG. 3 is a partially sectioned diagrammatic view of a cylinder liner, according to one embodiment.
Figure 4:
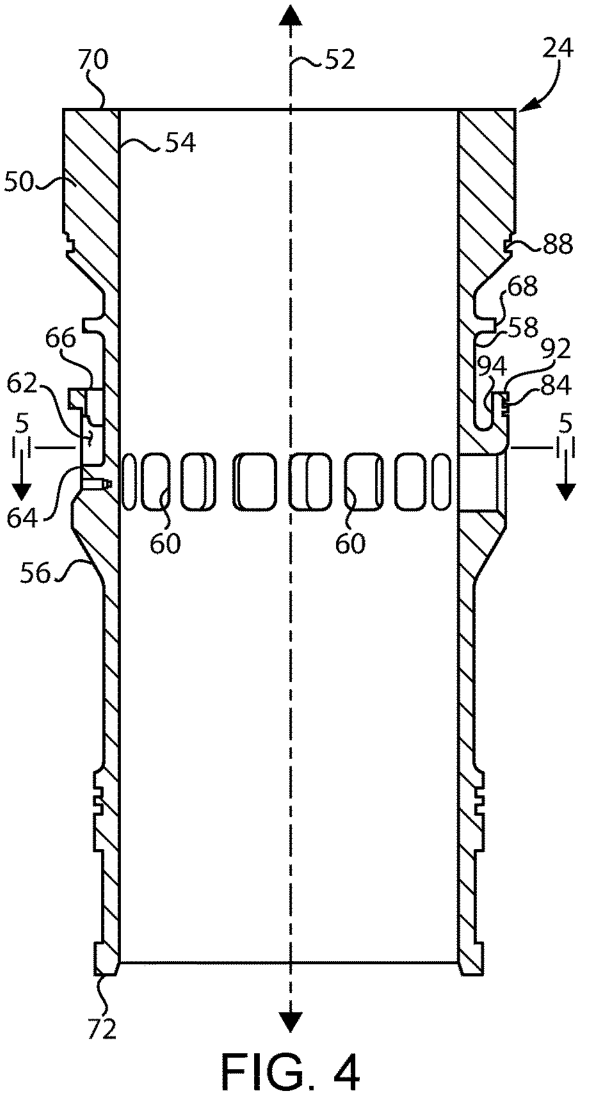
FIG. 4 is a sectioned diagrammatic view of a cylinder liner, according to one embodiment.
Figure 5:
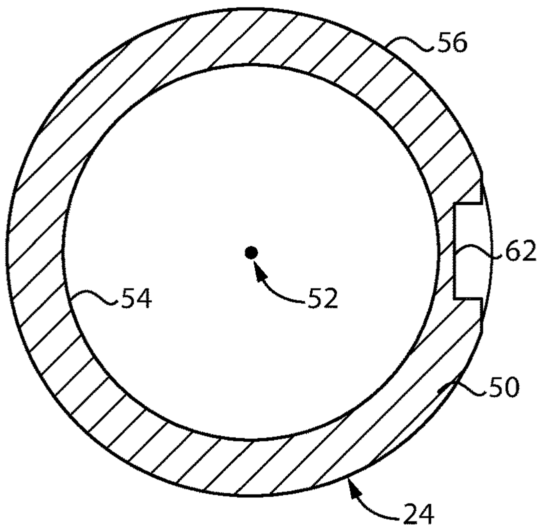
FIG. 5 is a sectioned view taken along line 5-5 of FIG. 4.

Referring also now to FIGS. 3-5, there are shown still further features of cylinder liner 24. Cylinder liner 24 includes an elongate liner body 50 defining a longitudinal axis 52, and including an inner liner surface 54, an outer liner surface 56 including an outer water jacket surface 58 extending circumferentially around longitudinal axis 52, and a plurality of combustion air ports 60. Outer liner surface 56 also includes an air annulus surface extending circumferentially around longitudinal axis 52. Combustion air ports 60 extend from outer liner surface 56 to inner liner surface 54 and are fluidly connected to air box 30 to convey combustion air into combustion chamber 29. Combustion air ports 60 may be formed in an alternating arrangement with a plurality of struts 61, circumferentially around longitudinal axis 52, and generally receive a radially inward flow of air for combustion from airbox 30 when piston 28 is positioned low enough in cylinder liner 24 to permit admission of the air.

Liner body 50 further includes an upper liner end 70 and a lower liner end 72. Water jacket surface 58 extends axially between combustion air ports 60 and upper liner end 70. Air annulus surface extends axially between combustion air ports 60 and lower liner end 72. Water jacket 32 is formed between water jacket surface 58 and jacket piece 46 and located axially between combustion air ports 60 and upper liner end 70. Air annulus 34 is formed between air annulus surface 96 and engine housing 14, typically crankcase 13. Water jacket surface 58 may be necked-down between upper liner end 70 and combustion air ports 60, providing a volume or cavity for a flow of coolant liquid as further discussed herein. Air annulus surface 96 may be necked-down between lower liner end 72 and combustion air ports 60, providing a cavity or potentially open space entirely for conveyance of air from air box 30 around cylinder liner 24.

Cylinder liner 24 also includes a coolant supply passage 62 extending from a coolant inlet 64 formed in outer liner surface 56, to a water jacket feed outlet 66 spaced axially from combustion air ports 60. Cylinder liner 24 also includes a flow balancer 68 for coolant, formed on outer liner surface 56, and positioned in a coolant flow path extending in an axial direction along water jacket surface 58 from water jacket feed outlet 66. When placed in service, all of the coolant liquid to be conveyed into and through water jacket 32 may be supplied by way of coolant supply passage 62.

It has been discovered that the provision of a singular coolant feed location can, unless addressed by balancing coolant liquid flow, result in an undesired lack of mixing and/or undesired pressure properties of coolant flowing through water jacket 32. As best shown in FIG. 3, water jacket surface 58 may include a conical upper surface 76 and a cylindrical lower surface 78. Flow balancer 68 may be formed on cylindrical lower surface 78. Cylinder liner 24 may also include a plurality of coolant passages 80 each opening in water jacket surface 58, for example in conical upper surface 76, and also opening in upper liner end 70. FIG. 3 illustrates a plurality of coolant passages 80 extending to and opening in upper liner end 70 as well as a plurality of threaded bolting bores 82 opening in upper liner end 70 to receive head bolts 44. Flow balancer 68 may be positioned so as to be impinged upon by a flow of coolant liquid from water jacket feed outlet 66 to coolant passages 80. In FIG. 3 arrows 100 illustrate an approximate and example flow of coolant that impinges upon flow balancer 68 and causes the coolant to spread circumferentially from outlet 66 so as to more uniformly feed relatively cold, fresh coolant into coolant passages 80.

In the illustrated embodiment, flow balancer 68 is fully circumferential of longitudinal axis 52 and projects radially outward. Also in the illustrated embodiment, flow balancer 68 has the form of a rib. Embodiments are contemplated where a flow balancer is only partially circumferential of a cylinder liner longitudinal axis. Still other variations can include multiple flow balancers at different axial locations, flow balancers formed by radially inward geometry of outer liner surface 56, fins, nodules, surface texturing, channels, or various other geometries including combination of those listed. In a practical implementation, a flow balancer will include at least one surface that extends radially relative to longitudinal axis 52.

Cylinder liner 24 may further include a seal groove 84 extending circumferentially around longitudinal axis 52 at a location axially between coolant inlet 64 and water jacket feed outlet 66. A first seal 86 may be seated in seal groove 84. Cylinder liner 24 may also include a second seal groove 88 extending circumferentially around longitudinal axis 52 at a location axially between conical upper surface 76 and upper liner end 70. A second seal 90 may be seated in second seal groove 88. One or more additional grooves 98 may be formed closer to lower liner end 72 to receive additional seals or other hardware that serves to seal around and/or locate cylinder liner 24 in engine 10 and/or power assembly 14.

Cylinder liner 24 may further include a lip protrusion 92 extending circumferentially around longitudinal axis 52 and having seal groove 84 formed therein. In the illustrated embodiment, lip protrusion 92 includes an upturned lip protrusion upturned in a direction of upper liner end 70. Alternative embodiments are within the scope of the present disclosure. A coolant annulus 94 extends radially inward of lip protrusion 92, and coolant supply passage 62 extends through lip protrusion 92 as best shown in FIG. 4.

INDUSTRIAL APPLICABILITY

Operating engine 10 can include reciprocating piston 28 within cylinder liner 24, receiving a flow of air for combustion via combustion air ports 60 when piston 28 passes combustion air ports 60 in a downward stroke, and pressurizing the air when piston 28 is moved in an upward stroke past combustion air ports 60. At a desired timing, fuel is injected via fuel injector 40 and compression-ignited in combustion chamber 29, with the resulting pressure and temperature rise driving position 28 once again downward. Exhaust valves 38 are opened at appropriate timings to permit conveyance of exhaust out of combustion chamber 29.

Meanwhile, coolant is supplied by way of water jumper 36 so as to flow through coolant passage 62 into water jacket 32. The flow of coolant through water jacket 32 and along water jacket surface 58 encounters flow balancer 68, causing the flow of coolant to spread and the coolant mix as coolant flows upwardly to enter coolant passages 80. Coolant flows through coolant passages 80 and into cylinder head assembly 22 for recirculation typically passing through a radiator.

As noted above, certain known engine configurations included both an upper water jacket and a lower water jacket around a cylinder liner. Known cylinder liners are commonly machined from a static iron casting. According to the present disclosure, certain of the feature changes relative to the state of the art can facilitate alternative manufacturing strategies including centrifugal casting. In particular, in some traditional designs the passage of coolant between a lower water jacket and an upper water jacket in a cylinder liner required holes or passages to be formed in struts of the cylinder liner separating the combustion air ports. Such a strategy was generally poorly suited to centrifugal casting. According to the present disclosure, the elimination of passages through struts 61 assists in improved suitability of the design for centrifugal casting. In addition, prior designs utilizing cooled passages through struts tended to naturally balance a flow of coolant around the liner. Thus, elimination of coolant passages in struts generated additional challenges respecting cooling flow balancing, addressed by way of flow balancer 68.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder liner comprising:

an elongate liner body defining a longitudinal axis, and including an inner liner surface, an outer liner surface including a water jacket surface extending circumferentially around the longitudinal axis, and a plurality of combustion air ports extending from the outer liner surface to the inner liner surface;

a coolant supply passage extending from a coolant inlet formed in the outer liner surface, to a water jacket feed outlet spaced axially from the plurality of combustion air ports; and a flow balancer for coolant, formed on the outer liner surface, positioned in a coolant flow path extending in an axial direction along the water jacket surface from the water jacket feed outlet, and the flow balancer including at least one surface extending in a radial direction and facing in opposition to a flow of coolant in the coolant flow path.

2. The cylinder liner of claim 1 wherein the elongate liner body includes an upper liner end and a lower liner end, and the water jacket surface is necked-down between the upper liner end and the plurality of combustion air ports.

3. The cylinder liner of claim 2 wherein the outer liner surface includes an air annulus surface that is necked-down between the lower liner end and the plurality of combustion air ports.

4. The cylinder liner of claim 2 wherein the water jacket surface includes a conical upper surface and a cylindrical lower surface, and the flow balancer is formed on the cylindrical lower surface.

5. The cylinder liner of claim 4 further comprising a plurality of coolant passages each opening in the conical upper surface and in the upper liner end.

6. The cylinder liner of claim 5 further comprising a seal groove extending circumferentially around the longitudinal axis at a location axially between the coolant inlet and the water jacket feed outlet.

7. The cylinder of claim 6 further comprising an upturned lip protrusion extending circumferentially around the longitudinal axis and having the seal groove formed thereon, and the coolant supply passage extends through the upturned lip protrusion.

8. The cylinder liner of claim 6 further comprising a second seal groove extending circumferentially around the longitudinal axis at a location axially between the conical upper surface and the upper liner end.

9. The cylinder liner of claim 1 wherein the flow balancer is at least partially circumferential of the longitudinal axis.

10. The cylinder liner of claim 9 wherein the flow balancer projects radially outward.

11. The cylinder liner of claim 10 wherein the flow balancer includes a rib and is fully circumferential of the longitudinal axis.

12. A power assembly for an engine comprising:

a cylinder head assembly including a cylinder head;

a cylinder liner coupled to the cylinder head assembly and defining a longitudinal axis;

a piston assembly including a piston;

the cylinder liner including an inner liner surface forming, together with the cylinder head and the piston, a combustion chamber, an outer liner surface including a water jacket surface extending circumferentially around the longitudinal axis, and a plurality of combustion air ports for conveying combustion air into the combustion chamber; and the cylinder liner further including a flow balancer formed on the water jacket surface;

wherein the water jacket surface includes a conical upper surface and a cylindrical lower surface, and the flow balancer is formed on the cylindrical lower surface.

13. The power assembly of claim 12 wherein the flow balancer includes a rib projecting radially outward.

14. The power assembly of claim 12 wherein the cylinder liner further includes a coolant supply passage extending from a coolant feed inlet formed in the outer liner surface to a water jacket feed outlet formed in the outer liner surface.

15. The power assembly of claim 14 wherein the cylinder liner further includes a lip protrusion including therein a seal groove located axially between the coolant feed inlet and the water jacket feed outlet.

16. The power assembly of claim 15 wherein a coolant annulus extends circumferentially around the longitudinal axis and radially inward from the lip protrusion.

17. The power assembly of claim 15 wherein the cylinder liner further includes a second seal groove located axially between the water jacket surface and an upper liner end, and the power assembly further comprising a first seal seated in the seal groove, a second seal seated in the second seal groove, and a jacket piece in contact with the first seal and the second seal such that an upper water jacket is formed between the jacket piece and the water jacket surface.

18. The power assembly of claim 12 further comprising a plurality of coolant passages opening in the water jacket surface, and the flow balancer is arranged fluidly between the water jacket feed outlet and the plurality of coolant passages.

19. The power assembly of claim 12 wherein the water jacket surface includes a conical upper surface and a cylindrical lower surface, and the flow balancer is formed on the cylindrical lower surface.

20. An engine comprising:

an engine housing forming an air box;

a power assembly supported in the engine housing and including a one-piece cylinder liner, the cylinder liner defining an axis and having formed therein a plurality of combustion air ports fluidly connected to the air box, and including an outer water jacket surface extending between the plurality of combustion air ports and an upper liner end, and an outer air annulus surface extending between the plurality of combustion air ports and a lower liner end;

the power assembly further including a jacket piece attached to the cylinder liner and forming, together with the outer water jacket surface, an upper water jacket;

an air annulus formed between the outer air annulus surface and the engine housing and fluidly connected to the air box;

a flow balancer for coolant, formed on the outer liner surface at a flow balancer axial location relative to the axis; and the power assembly further including a piston movable between a first position in the cylinder liner where the piston is positioned below the flow balancer axial location and low enough in the cylinder liner to permit admission of air through the plurality of combustion air ports, and a second position where the piston is positioned at least partially above the flow balancer axial location.

* * * * *